United States Patent
Torrione et al.

(10) Patent No.: US 10,958,877 B2
(45) Date of Patent: Mar. 23, 2021

(54) SYSTEM AND METHOD FOR INHIBITING OR CAUSING AUTOMATED ACTIONS BASED ON PERSON LOCATIONS ESTIMATED FROM MULTIPLE VIDEO SOURCES

(71) Applicant: Helmerich & Payne Technologies, LLC, Tulsa, OK (US)

(72) Inventors: Peter A. Torrione, Durham, NC (US); Kenneth D. Morton, Jr., Durham, NC (US)

(73) Assignee: Helmerich & Payne Technologies, LLC, Tulsa, OK (US)

( * ) Notice: Subject to any disclaimer, the term of this patent is extended or adjusted under 35 U.S.C. 154(b) by 0 days.

(21) Appl. No.: 14/938,467

(22) Filed: Nov. 11, 2015

(65) Prior Publication Data
US 2016/0134843 A1    May 12, 2016

Related U.S. Application Data

(60) Provisional application No. 62/078,569, filed on Nov. 12, 2014.

(51) Int. Cl.
*H04N 7/18*     (2006.01)
*G05B 19/048*   (2006.01)
(Continued)

(52) U.S. Cl.
CPC .............. *H04N 7/181* (2013.01); *E21B 44/00* (2013.01); *G05B 19/042* (2013.01);
(Continued)

(58) Field of Classification Search
CPC .......... G08B 13/19602; G06K 9/00463; G05B 19/048; H04N 7/181; E21B 44/00
(Continued)

(56) References Cited

U.S. PATENT DOCUMENTS 6,256,046 B1 *  7/2001  Waters ................... G06F 3/011
                                                 345/473
6,469,734 B1 * 10/2002  Nichani ................ H04N 7/188
                                                 348/152
(Continued)

FOREIGN PATENT DOCUMENTS

WO    2016147045 A1    9/2016
WO    2017042677 A1    3/2017
(Continued)

OTHER PUBLICATIONS

PCT Search Report & Written Opinion (PCT/US2015/060174), dated Jan. 27, 2016.

(Continued)

*Primary Examiner* — Jeffery A Williams
*Assistant Examiner* — Kristin Dobbs
(74) *Attorney, Agent, or Firm* — Kilpatrick Townsend & Stockton LLP

(57) ABSTRACT

The invention relates to systems and method for inhibiting or causing automated actions based on estimated person locations comprising multiple video sources configured to detect the location of one or more persons wherein at least one video source is calibrated for a known location and pose. The invention further comprises at least one processor operably connected to a calibrated video source wherein said processor aggregates possible person locations. These systems and method may be useful for initiating or interrupting the automated activity of equipment in the presence of personnel.

17 Claims, 2 Drawing Sheets

(51) Int. Cl.
*G06K 9/00* (2006.01)
*G05B 19/042* (2006.01)
*E21B 44/00* (2006.01)

(52) U.S. Cl.
CPC ....... *G05B 19/048* (2013.01); *G06K 9/00771* (2013.01); *G05B 2219/24097* (2013.01); *G05B 2219/24215* (2013.01); *G05B 2219/49141* (2013.01)

(58) Field of Classification Search
USPC ........................................................ 348/159
See application file for complete search history.

(56) References Cited

U.S. PATENT DOCUMENTS

| | | | |
|---|---|---|---|
| 6,646,676 | B1 | 11/2003 | Dagraca et al. |
| 7,874,351 | B2 | 1/2011 | Hampton et al. |
| 7,933,166 | B2 | 4/2011 | Goodman |
| 8,218,826 | B2 | 7/2012 | Ciglenec et al. |
| 8,233,667 | B2 | 7/2012 | Helgason et al. |
| 8,363,101 | B2 | 1/2013 | Gschwendtner et al. |
| 8,395,661 | B1 | 3/2013 | Olsson et al. |
| 8,547,428 | B1 | 10/2013 | Olsson et al. |
| 8,622,128 | B2 | 1/2014 | Hegeman |
| 8,812,236 | B1 | 8/2014 | Freeman et al. |
| 8,873,806 | B2 | 10/2014 | Kiest |
| 9,041,794 | B1 | 5/2015 | Olsson et al. |
| 9,134,255 | B1 | 9/2015 | Olsson et al. |
| 9,279,319 | B2 | 3/2016 | Savage |
| 9,410,877 | B2 | 8/2016 | Maxey et al. |
| 9,464,492 | B2 | 10/2016 | Austefjord et al. |
| 9,518,817 | B2 | 12/2016 | Baba et al. |
| 9,651,468 | B2 | 5/2017 | Rowe et al. |
| 9,664,011 | B2 | 5/2017 | Kruspe et al. |
| 9,677,882 | B2 | 6/2017 | Kiest |
| 9,706,185 | B2 | 7/2017 | Ellis |
| 9,869,145 | B2 | 1/2018 | Jones et al. |
| 9,912,918 | B2 | 3/2018 | Samuel |
| 9,915,112 | B2 | 3/2018 | Geehan et al. |
| 10,227,859 | B2 | 3/2019 | Richards et al. |
| 10,328,503 | B2 | 6/2019 | Osawa et al. |
| 10,567,735 | B2 | 2/2020 | Ellis et al. |
| 2012/0267168 | A1* | 10/2012 | Grubb ................ B23K 26/0093 175/16 |
| 2014/0002617 | A1 | 1/2014 | Zhang et al. |
| 2014/0326505 | A1 | 11/2014 | Davis et al. |
| 2014/0333754 | A1 | 11/2014 | Graves et al. |
| 2015/0138337 | A1 | 5/2015 | Tjhang et al. |
| 2015/0218936 | A1 | 8/2015 | Maher et al. |
| 2017/0089153 | A1 | 3/2017 | Teodorescu |
| 2017/0161885 | A1 | 6/2017 | Parmeshwar et al. |
| 2017/0167853 | A1 | 6/2017 | Zheng et al. |
| 2017/0322086 | A1 | 11/2017 | Luharuka et al. |
| 2018/0180524 | A1 | 6/2018 | François et al. |
| 2019/0100988 | A1 | 4/2019 | Ellis et al. |
| 2019/0102612 | A1 | 4/2019 | Takemoto et al. |
| 2019/0136650 | A1 | 5/2019 | Zheng et al. |
| 2019/0141294 | A1 | 5/2019 | Thörn et al. |
| 2019/0206068 | A1 | 7/2019 | Stark et al. |

FOREIGN PATENT DOCUMENTS

| | | |
|---|---|---|
| WO | 2017132297 A2 | 8/2017 |
| WO | 2017176689 A1 | 10/2017 |
| WO | 2018093273 A1 | 5/2018 |
| WO | 2018131485 A1 | 7/2018 |
| WO | 2018148832 A1 | 8/2018 |
| WO | 2018157513 A1 | 9/2018 |

OTHER PUBLICATIONS

You Want what kind of a view?—Dakatec Inc. Patent Drawings, https://www.dakatec.com/you-want-what-kind-of-a-view/ [From the Internet] pp. 1-2, Jun. 2019.

Perspective View—What is Perspective View?, http://www.computerhope.com/jargon/p/persect.htm, [From the Internet] p. 1, Jun. 2019.

\* cited by examiner

SYSTEM AND METHOD FOR INHIBITING OR CAUSING AUTOMATED ACTIONS BASED ON PERSON LOCATIONS ESTIMATED FROM MULTIPLE VIDEO SOURCES

FIELD OF THE INVENTION

The invention relates to systems and methods for inhibiting or causing automated actions based on person locations estimated from multiple video sources.

BACKGROUND AND SUMMARY

Modern drilling involves scores of people and multiple inter-connecting activities. Obtaining real-time information about ongoing operations is of paramount importance for safe, efficient drilling. As a result, modern rigs often have thousands of sensors actively measuring numerous parameters related to vessel operation, in addition to information about the down-hole drilling environment.

Despite the multitude of sensors on today's rigs, a significant portion of rig activities and sensing problems remain difficult to measure with classical instrumentation, and person-in-the-loop sensing is often utilized in place of automated sensing.

By applying automated, computer-based video interpretation, continuous, robust, and accurate assessment of many different phenomena can be achieved through pre-existing video data without requiring a person-in-the-loop. Automated interpretation of video data is known as computer vision, and recent advances in computer vision technologies have led to significantly improved performance across a wide range of video-based sensing tasks. Computer vision can be used to improve safety, reduce costs and improve efficiency.

A long standing goal in many industrial settings is the automation of machinery to improve speed and efficiency. However, automated machinery motion and other automated actions in industrial settings can pose significant risks to personnel in these environments. Accurate information about the locations of persons could help to prohibit certain actions at certain times when people may be in harm's way.

Current technologies for detecting person location (e.g., RFID, manual person location reporting, lock-out keys) all require personnel to take specific actions to ensure their locations are known. These actions (e.g., wearing the RFID, reporting your location, using your key) represent an unnecessary failure point, which results in preventable injuries. In contrast to these approaches, video data from multiple cameras can provide accurate person location information without requiring any actions on the part of the people in the scene, and in an unobtrusive manner. Therefore, there is a need for a video-based technique for tracking person locations in an industrial environment and the incorporation of that information into automated system controls to prohibit certain activities when personnel might be in danger.

DETAILED DESCRIPTION

Figure 1:
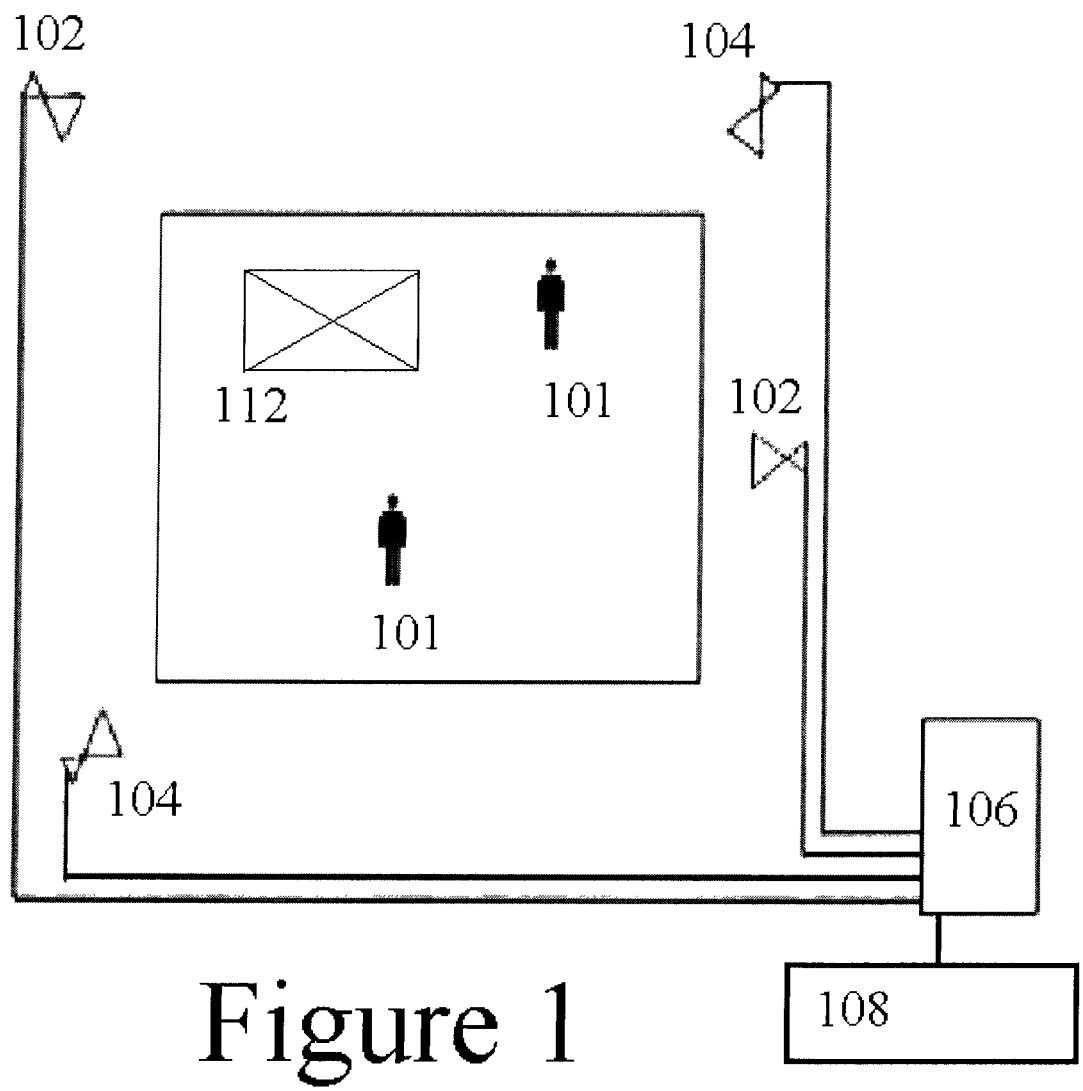
FIG. 1 depicts one of many embodiments of a system involving multiple video sources cameras for monitoring personnel location.

The Personnel Video Monitoring system, "PVM", consists of several parts. The PVM may include multiple individual video sources 102, each of which may or may not view the same region, and each of which may have been calibrated so its location and pose relative to the other video source 102 is known. Each video source 102 may be a camera 104. Each camera 104 may contain or be connected to a computer 106 which performs person detection on the scene viewed by that camera 104 and may generate a "bounding box" (or other additional information) for each person 101 in each frame. Each camera 104 may transmit each bounding box to a central computing resource 106, which aggregates possible person 101 locations across all of the cameras 104 (using each camera's bounding boxes, location, and pose information) to estimate actual person 101 locations via triangulation, and false-alarm rejection. This process results in a final list of person 101 coordinates in 2- or 3-Dimensions. The resulting information about person 101 locations may then be presented to the end-user on a 2- or 3-D visualization of the environment, with specific icons representing each person's 101 location or provided to machinery control systems 108 to cause or inhibit certain automated activities. These automated activities often involve the automated movement of mechanical equipment 112 which is capable of injuring a person 101 who is in the vicinity. Examples of such equipment 112 could be conveyors, cranes, hoists, pumps, drilling equipment, carts, sleds, elevators, winches, top drives, industrial equipment and many others.

For calibration, any number of fiducial objects with known X, Y, and Z locations can be used within the scene. Typical fiducial objects include a grid of black and white squares, or 3-dimensional objects with multiple distinctly colored parts. Alternatively, calibration can be accomplished with pre-existing fiducials in the scene (e.g., known locations of machinery). Points on these fiducials may be detected automatically, or manually identified (by clicking) in each camera view. Calibration can then proceed using any of a number of camera parameter optimization techniques (e.g., linear or non-linear least-squares, batch-least-squares, etc.).

Any of a number of person detection algorithms can be utilized on a per-camera basis (e.g., HOG or ICF). Different algorithms provide different performances in terms of probability of detecting a person as well as probability of generating a bounding box when no person is present. Each approach also provides different sensitivities to lighting and occlusion and different algorithms have different computational requirements. As a result, the choice of person detection algorithm can be accomplished on a per-installation basis.

Person detections may consist of a "bounding box" surrounding the person in each frame, as well as additional information (e.g., the index of the current camera with the detection, features extracted from the image around the person, the raw [RGB] data inside and immediately surrounding the bounding box, the time and frame number of the person detection, other meta-data, as well as various other parameters estimated during the person detection process).

Person detection data (bounding boxes, RGB color data, or associated meta-data) may be transferred to the central tracking computer 106 using TCP/IP, UDP, or any other suitable data transfer protocol.

Person detections can be aggregated temporally within a camera 104 to reduce false alarms, and improve the probability of detection by keeping track of person detection confidences over time within a camera view. This can prevent spurious false alarms, and help to improve detection of difficult-to-see persons.

The bounding box from each camera 104 may be combined with the information about each camera's pose and location to provide a global coordinate estimate of the person's location using either bearing-only or joint bearing-and-range-based triangulation.

For horizontally oriented cameras 104, the only information about a person's distance from the camera is due to the height of the detected bounding box. This information may be combined with the bounding box location to estimate both a distance and a scale, though the box height is often too noisy to provide robust range estimation.

For cameras 104 oriented somewhat vertically with respect to the horizon, person range can be estimated using the centroid of the person's bounding-box, and assuming that the mid-point of the person is in some reasonable range (e.g., waistline is above 24" and below 50"), which enables joint bearings (angle) and range measurements.

The bearings and range information from each camera 104 may then be superimposed on a grid-representation of the area under consideration. This grid may take the form of a 2-D matrix of points, where each point represents a square region with nominal side length (e.g., 2", 6", 1') (the grid can be adaptively re-sized to account for additional cameras or to increase processing speed). Each detection from each camera 104 counts as a "vote" into all of the grid squares within a given distance of the line segment generated by projecting the bounding box centroid into the plan-view. Votes are aggregated across all the cameras 104 and all the detections. The resulting vote plan-view may be smoothed using a Gaussian filter whose size is proportional to the expected size of persons in the scene. This smoothed image represents the spatial confidence map for person locations in the current frame.

The resulting current time spatial confidence map, c(t), is combined with the confidence map from the previous frame, c(t−1), in an IIR manner, to form the final confidence map, C(t). e.g., $$C(t) = \alpha c(t) + (1-\alpha) c(t-1),$$

where $\alpha \in [0,1]$ is chosen to provide adequate tradeoffs between fast adaptation (large $\alpha$) and false alarm reduction (small $\alpha$).

The final confidence map, C(t), is then transformed into discrete person locations using local maxima of the 2- or 3-D surface. Consistent person identification may be accomplished using Kalman filtering on the resulting discrete person locations over time, where the identity of each person is attached to the most likely current local maxima given the prediction of the Kalman filter. Persons can appear and be removed from the scene when the likelihood of their track is reduced below a threshold. Other tracking algorithms can be used in place of the Kalman filter, including particle filters, MCMC tracking approaches, and others.

Various ad-hoc parameters are used to enhance the person detection and tracking. For example, realistic human motion is highly constrained (persons are extremely unlikely to move faster than 40 km/h, or about 11 m/s). These velocity constraints can therefore be leveraged in the tracking by invalidating any human track that involves jumps in excess of ⅓ meters per frame (in a 30 Hz video), for example.

Persistent clutter (objects in the scene that cause person-detectors to "false alarm") can pose a serious problem for accurate person tracking and localization. In the case of static background objects, performance may be significantly improved by incorporating either change-detection (via adaptive Gaussian Mixture Models), or static clutter rejection techniques (by training a person detection classifier to reject instances of the static background under consideration). These options are available at the user's specification and may be accessible from the main graphical user interface (see below).

Determining when a new person has entered or left the scene can be accomplished in a number of ways. As discussed above, persons can be removed from the scene when the likelihood of their track has decreased below a certain level, or no person detections in any camera corresponding to that person have occurred in a given time. Person birth/death processes can also take into account egress and ingress points on the spatial rig representation. For example, persons may be expected to enter and exit the spatial map near doors, or stairwells, but are unlikely to disappear from the scene when standing in the middle of the room. These regions are used in the person tracking/birth/death processing, and may be set by the user through the graphical user interface.

A graphical user interface 120 (GUI) may enable the end-user to visualize the resulting person locations in the individual video streams, as well as in a 2- or 3-D representation of the space. A preferred embodiment of a GUI may consist of several parts, including a row of video feeds from each camera in the PVM system. These images may be "clickable". Clicking any video stream changes the main video visualization to correspond to that camera. This action makes the camera selected the "active camera".

A GUI 120 may also include a main video visualization showing the video from the active camera. Each video may be enhanced by drawing the detected bounding boxes for all person detections, as well as ellipses representing the persons estimated location projected onto the ground. The ellipses are generated by projecting a fixed-radius circle around each person location onto the ground plane using the camera parameters. Each circle on each detected person is assigned a color, and the color-to-person relationship is maintained throughout the video (e.g., the person with the green circle will always be represented by a green circle). The radius, thickness, and transparency of each person identification circle is proportional to the certainty with which that person is currently localized. As a person leaves a scene, or is occluded, the circle corresponding to their location will increase in size, decrease in thickness, and increase in transparency, until it disappears and the person is "lost".

A plan-view or 3-D map of the area under surveillance may show the locations of the persons in world-coordinates, as well as the locations of the cameras. Persons are represented as simplified icons and the colors in the map may be chosen to match the circles drawn around each person in the main frame. In the plan-view visualization, the active camera is identified by changing its color (e.g., the active camera icon may be red while the other camera icons are black).

The GUI may also include various options for saving, loading, exporting, starting, stopping, and changing parameters of the UI.

In addition, depending on needs, the outputs of the person localization information may be coupled into SCADA control systems, and utilized to either raise an alarm 110 if a person is in close proximity to moving equipment, or to inhibit automated actions when a person is in too close proximity to the equipment.

In FIG. 1, video sources 102 and cameras 104 are mounted with arbitrary pan, tilt and/or zoom settings in arbitrary locations around the scene to be surveyed. In a preferred embodiment, at least three cameras 104 should be able to "view" each spatial location where people 101 should be tracked and personnel at the maximum distance in each camera 104 view should be at least 64 pixels in height. Complete overlap between camera 104 views is not necessary as long as at least three cameras 104 are able to view each spatial location where people should be tracked. Given enough cameras 104, different cameras 104 can view completely different regions. These cameras 104 are connected to processor 106 which is configured to monitor the location of the personnel 101 as discussed. Processor 106 is also connected to machinery control system 108 which is configured to initiate or interrupt any automated actions of equipment 112 based on the location of the personnel 101.

Figure 2:
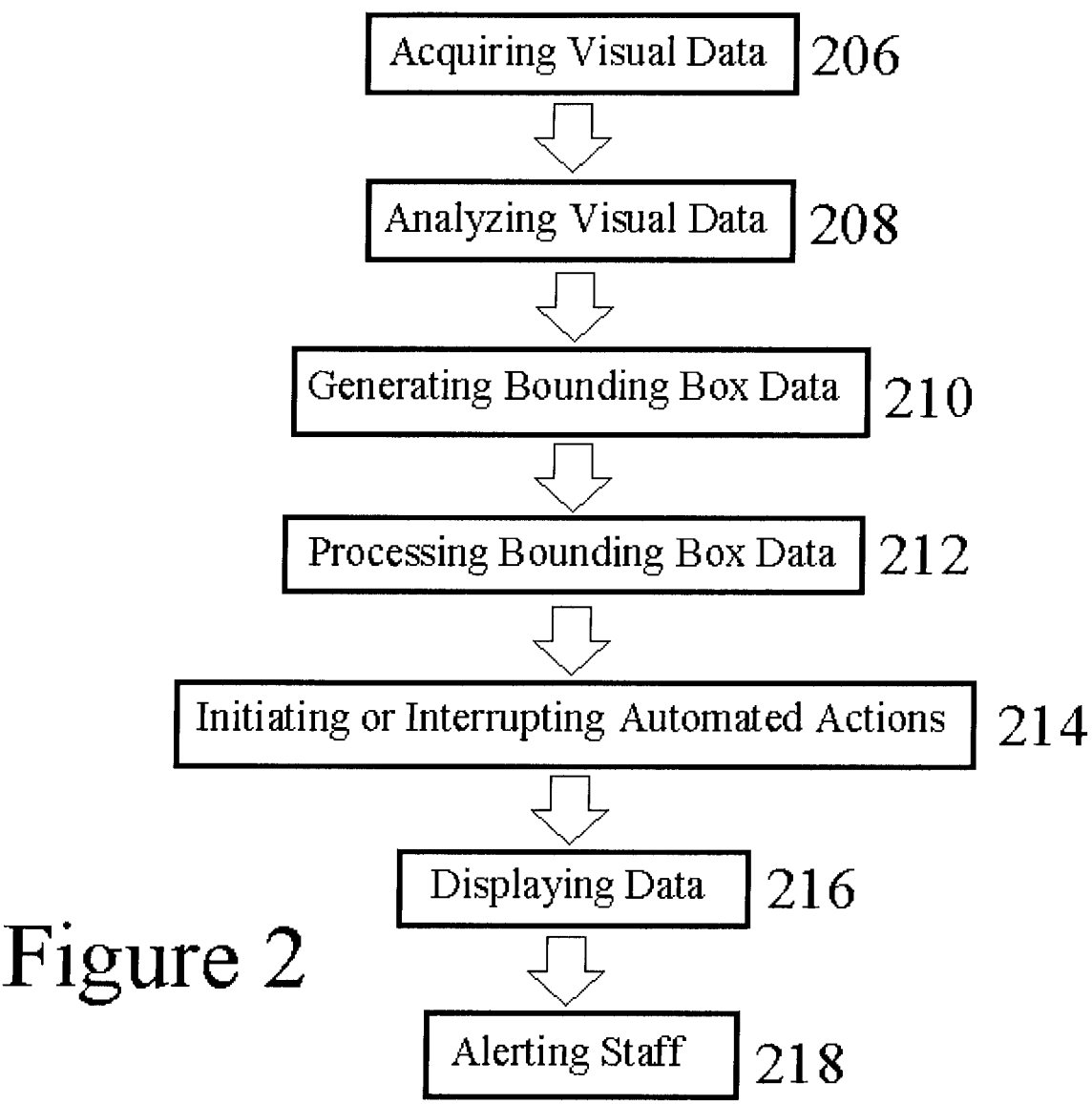
FIG. 2 depicts a potential series of steps involved in a method for monitoring person location and controlling machinery accordingly.

In FIG. 2, the steps of potential method of controlling automated equipment 112 is described. The method includes acquiring visual data, step 206, analyzing visual data, step 208, generating bounding box data, step 210, processing bounding box data, step 212, initiating or interrupting automated actions, step 214, displaying data, step 216 and alerting staff, step 218. Other embodiments may use some or all of these steps to achieve the primary objective of initiating or interrupting automated action based on the location of personnel.

Disclosed embodiments relate to a system for inhibiting or causing automated actions based on estimated person locations. The system may include multiple video sources 102 which are configured to detect the location of one or more persons 101. The video source 102 may be calibrated for a known location and pose. The system also includes at least one processor 106 operably connected to the calibrated video sources 102. The processor 106 aggregates possible person 101 locations. The system may also include a machinery control system 108 which is configured to initiate or interrupt automated activities in response to possible person 101 locations.

Alternative embodiments of the system may also include a visualization of the environment presented to an end user, and/or an alarm 110 for alerting staff to the occurrence of a pre-determined condition. Certain embodiments will utilize a plurality of video sources 102 which are combined to provide enhanced person location confidence. In many embodiments the at least one video source 102 will be a camera 104.

Another disclosed embodiment relates to a method for inhibiting or causing automated actions based on estimated person locations. The method may include the steps of acquiring visual data 206 from at least one video source, analyzing said visual data 208 and inhibiting or causing automated actions 214 based on said data using a machinery control system. Additional embodiments may also include the steps of displaying the acquired or analyzed data 216, alerting staff to the occurrence of a pre-determined condition 218, generating bounding box data 210 for at least one person in a frame and/or processing bounding box data 212 to determine person locations via triangulation.

What is claimed is:

1. A system for inhibiting or causing automated actions based on estimated person locations comprising:
    a plurality of video sources configured to detect a location of one or more persons on a drilling site having a drilling rig and one or more pieces of machinery associated with the drilling rig, each of the one or more pieces of machinery having a respective known location, wherein at least one video source is calibrated using pre-existing fiducials in visual data from the at least one video source, wherein the pre-existing fiducials comprise the one or more pieces of machinery, wherein the calibration is based on the known locations of the one or more pieces of machinery, and wherein at least one video source is positioned to capture a perspective view, and
    at least one processor operably connected to the calibrated video sources wherein said processor aggregates possible person locations, generates bounding box data for at least one person in a frame, and processes the bounding box data to determine person locations in 3-dimensions; and
    a machinery control system configured to initiate, alter or interrupt automated activities in response to determined person locations in 3-dimensions, wherein the machinery control system is operably connected to equipment.

2. The system of claim 1, further comprising a visualization of an environment presented to an end user.

3. The system of claim 1, wherein the plurality of video sources are combined to provide enhanced person location confidence.

4. The system of claim 1, further comprising an alarm for alerting staff to an occurrence of a pre-determined condition.

5. The system of claim 1, wherein at least one video source is a camera.

6. A method for inhibiting, altering or causing automated actions based on estimated person locations on a drilling site having a drilling rig, the method comprising:
    acquiring visual data from at least one video source, wherein at least one video source is positioned to capture a perspective view and calibrated using pre-existing fiducials in the visual data, wherein the pre-existing fiducials comprise one or more pieces of machinery associated with the drilling rig, and wherein the calibration is based on known locations of the one or more pieces of machinery,
    analyzing the visual data,
    generating bounding box data for at least one person in a frame;
    processing the bounding box data to determine person locations in 3-dimensions; and
    inhibiting or causing automated actions based on the person locations in 3-dimensions using a machinery control system, wherein the machinery control system is operably connected to equipment.

7. The method of claim 6, further comprising displaying the acquired or analyzed data.

8. The method of claim 6, further comprising alerting staff to an occurrence of a pre-determined condition.

9. The method of claim 6, further comprising processing bounding box data to determine person locations via triangulation.

10. A system for monitoring personnel location on a drilling site having a drilling rig and controlling automated equipment in response to personnel location, the system comprising:
    at least one video stream provided by at least one camera operably connected to a processor, wherein at least one camera is positioned to capture a perspective view and calibrated using pre-existing fiducials in the video stream, wherein the pre-existing fiducials comprise one or more pieces of machinery associated with the drilling rig, wherein the calibration is based on known locations of the one or more pieces of machinery, and wherein the processor is configured to monitor a location of any personnel present in the video stream in 3-dimensions and generate bounding box data for any personnel present in the video stream in 3-dimensions;

a machinery control system operably connected to the processor, wherein the machinery control system is configured to receive commands to either initiate or stop automated operations of equipment based on the bounding box data for personnel present in the video stream in 3-dimensions; and a graphical user interface configured to provide the video stream to an operator.

11. The system of claim 1, wherein the equipment is down-hole drilling equipment.

12. The system of claim 1, wherein the equipment is selected from the group consisting of conveyors, cranes, hoists, pumps, carts, sleds, elevators, winches, and top drives.

13. The system of claim 1, wherein the calibration comprises detecting the pre-existing fiducials in the visual data automatically.

14. The system of claim 1, wherein the calibration comprises using a camera parameter optimization technique selected from the group comprising: linear least-squares, non-linear least-squares, and batch-least squares.

15. The method of claim 6, wherein the calibration comprises detecting the pre-existing fiducials in the visual data automatically.

16. The method of claim 6, wherein the calibration comprises using a camera parameter optimization technique selected from the group comprising: linear least-squares, non-linear least-squares, and batch-least squares.

17. The system of claim 10, wherein the calibration comprises detecting the pre-existing fiducials in the video steam automatically.

* * * * *